United States Patent [19]

Elrod et al.

[11] Patent Number: 4,719,476

[45] Date of Patent: Jan. 12, 1988

[54] SPATIALLY ADDRESSING CAPILLARY WAVE DROPLET EJECTORS AND THE LIKE

[75] Inventors: Scott A. Elrod, Menlo Park; Butrus T. Khuri-Yakub, Palo Alto; Calvin F. Quate, Stanford, all of Calif.

[73] Assignee: Xerox Corporation, Stamford, Conn.

[21] Appl. No.: 853,252

[22] Filed: Apr. 17, 1986

[51] Int. Cl.⁴ ........................................ G01D 15/16

[52] U.S. Cl. ........................ 346/140 R; 239/102.2; 310/323; 310/328; 310/334

[58] Field of Search .................... 346/140, 75, 1.1; 239/4, 102.2; 310/334, 323, 328

[56] References Cited

U.S. PATENT DOCUMENTS

| | | | |
|---|---|---|---|
| 3,211,088 | 10/1965 | Naiman | 346/140 X |
| 4,275,290 | 6/1981 | Cielo | 346/140 X |
| 4,308,547 | 12/1981 | Lovelady et al. | 346/140 |

OTHER PUBLICATIONS

Greanias, E. C.; Hydraulic-Electrostatic Printer, IBM TDB, vol. 13, No. 5, Oct. 1970, pp. 1131-1312.

W. Eisenmenger, "Surface Tension of Water," *Acustica*, 1959, vol. 9, pp. 327-340.

Boucher, et al., "The Fundamentals of the Ultrasonic Alomization of Medicated Solutions," *Annals of Allergy*, Nov. 1968, vol. 26, pp. 591-600.

Kenneth E. Bean, "Anisotropic Etching of Silicon," *IEEE*, vol. ED-25, No. 10, Oct. 1978.

*Primary Examiner*—Joseph W. Hartary

[57] ABSTRACT

Provision is made for selectively addressing inividual crests of traveling or standing capillary surface waves to eject droplets from the selected crests on command. To that end, the addressing mechanism of this invention locally increase the surface pressure acting on the selected crests and/or locally reduce the surface tension of the liquid within the selected crests. The preferred addressing mechanisms have sufficient spatial resolution to address a single crest substantially independently of its neighbors.

Discrete addressing mechanisms having a plurality of individual addressing elements are especially attractive for liquid ink printing and similar applications, not only because their individual addressing elements may be spatially fixed, but also because the spatial frequency of their addressing elements may be matched to the spatial frequency of the capillary wave. Such frequency matching enables selected crests of the capillary wave to be addressed in parallel, such as for line printing. Preferably, the capillary wave for a printer is a spatially stabilized standing wave, so that the crests and troughs of the capillary wave are locked in predetermined spatial locations.

12 Claims, 14 Drawing Figures

SPATIALLY ADDRESSING CAPILLARY WAVE DROPLET EJECTORS AND THE LIKE

FIELD OF THE INVENTION

This invention relates to methods and means for spatially controlling the behavior of capillary surface waves as a function of time and, more particularly, to methods and means for selectively addressing individual crests of such surface waves to temporarily alter the surface properties, such as the surface pressure and/or surface tension, of the liquid within the selected crests on command. For example, an image may be printed by selectively addressing crests of a capillary wave excited on the surface of a pool of liquid ink to eject droplets of ink from the selected crests to form the image.

BACKGROUND OF THE INVENTION

Ink jet printing has the inherent advantage of being a plain paper compatible, direct marking technology. However, the technology has been slow to mature, at least in part because most "continuous stream" and "drop on demand" ink jet print heads include nozzles. Although steps have been taken to reduce the manufacturing cost and increase the reliability of these nozzles, experience suggests that the nozzles will continue to be a significant obstacle to realizing the full potential of the technology.

Others have proposed nozzleless liquid ink print heads, including ultrasonic print heads, to avoid the cost and reliability disadvantages of conventional ink jet printing while retaining its direct marking capabilities. See, for example, Lovelady et al. U.S. Pat. No. 4,308,547, which issued Dec. 24, 1981 on a "Liquid Drop Emitter." Furthermore, significant progress has been made in the development of relatively low cost, nozzless, ultrasonic print heads. See a copending and commonly assigned United States patent application of C. F. Quate et al, which was filed Sept. 16, 1985 under Ser. No. 776,291 on a "Leaky Rayleigh Wave Nozzeless Droplet Ejector".

Capillary surface waves (viz., those waves which travel on the surface of a liquid in a regime where the surface tension of the liquid is such a dominating factor that gravitational forces have negligible effect on the wave behavior) are attractive for liquid ink printing and similar applications because of their periodicity and their relatively short wavelengths. However, it appears that they have not been considered for such applications in the past. As a practical guideline, surface waves having wavelengths of less than about 1 cm. are essentially unaffected by gravitational forces because the forces that arise from surface tension dominate the gravitational forces. Thus, the spatial frequency range in which capillary waves exist spans and extends well beyond the range of resolutions within which non-impact printers normally operate.

As is known, a capillary wave is generated by mechanically, electrically, acoustically, thermally, pneumatically, or otherwise periodically pertubing the free surface of a volume of liquid at a suitably high frequency, $\omega_e$. In the presence of such a perturbation, a traveling capillary surface wave having a frequency, $\omega_{tc}$, equal to the frequency, $\omega_e$, of the perturbance (i.e., the excitation frequency) propagates away from the site of the perturbance with a wave front geometry determined by the geometry of the perturbing source. In another variation, capillary waves can be generated with a parametric process. When the amplitude of the surface perturbation equals or exceeds a so-called onset amplitude level, one or more capillary waves are generated on the free surface of the liquid. Standing waves are produced by a parametric excitation of the liquid, with a frequency, $\omega_{sc}$, equal to one half the excitation frequency (i.e., $\omega_{sc}=\omega_e/2$). This parametric process is described in substantial detail in the published literature with reference to a variety of liquids and a wide range of operating conditions. See, for example, Eisenmenger, W., "Dynamic Properties of the Surface Tension of Water and Aeguous Solutions of Surface Active Agents with Standing Capillary Waves in the Frequency Range from 10 kc/s to 1.5 Mc/s", *Acustica,* Vol. 9, 1959, pp. 327-340.

While the detailed physics of traveling and standing capillary surface waves are beyond the scope of this invention, it is noted that waves of both types are periodic and generally sinusoidal at lower amplitudes, and that they retain their periodicity but become non-sinusoidal as their amplitude is increased. As discussed in more detail hereinbelow, printing is facilitated by operating in the upper region of the amplitude range, where the waves have relatively high, narrow crests alternating with relatively shallow, broad troughs.

Standing capillary surface waves have been employed in the past to more or less randomly eject droplets from liquid filled reservoirs. For example, medicinal inhalants are sometimes dispensed by nebulizers which generate standing waves of sufficient amplitude to produce a very fine mist, known as an "ultrasonic fog". See Boucher, R. M. G. and Krueter, J., "The Fundamentals of the Ultrasonic Atomization of Medicated Solutions," *Annals of Allergy,* Vol. 26, Nov. 1968, pp. 591-600. However, standing waves do not necessarily produce an ultrasonic fog. Indeed, Eisenmenger, supra at p. 335, indicates that the excitation amplitude required for the onset of an ultrasonic fog is about four times the excitation amplitude required for the onset of a standing capillary wave, so there is an ample tolerance for generating a standing capillary surface wave without creating an ultrasonic fog.

As will be appreciated, there are fundamental control problems which still have to be solved to provide a traveling or standing capillary surface wave printer. In contrast to the non-selective ejection behavior of known capillary wave droplet ejectors, such as the aforementioned nebulizers, the printing of a two dimensional image on a recording medium requires substantial control over the spatial relationship of the individual droplets which are deposited on the recording medium to form the image, For instance, In the case of a line printer, this control problem may be viewed as being composed of a spatial control component along the tangential or "line printing" axis of the printer and of a timing component along its sagittal or "cross-line" axis.

SUMMARY OF THE INVENTION

Therefore, in accordance with the present invention, provision is made for selectively addressing individual crests of traveling or standing capillary surface waves to eject droplets from the selected crests on command. To that end, the addressing mechanisms of this invention locally alter the surface properties of the selected crests. For example, the local surface pressure acting on the selected crests and/or the local surface tension of the liquid within the selected crests may be changed.

In keeping with one of the more detailed aspects of this invention, there are discrete addressing mechanisms having a plurality of individual addressing elements. Although scanners may be utilized to selectively address individual crests of a capillary surface wave, discrete addressing mechanisms are especially attractive for printing, not only because their individual addressing elements may be spatially fixed with respect to one dimension of the recording medium, but also because the spatial frequency of their addressing elements may be matched to the spatial frequency of the capillary wave. Such frequency matching enables selected crests of the capillary wave to be addressed in parallel, thereby allowing droplets to be ejected in a controlled manner from the selected crests substantially simultaneously, such as for line printing.

A copending and commonly assigned United States patent application of Elrod et al., which was filed Apr. 17, 1986 under Ser. No. 853,253, on "Spatial Stabilization of Standing Capillary Surface Waves" describes methods and means for maintaining the wave structure (i.e., the crests and troughs) of a standing capillary surface wave in a predetermined and repeatable spatial location with respect to an external reference. Such an alignment mechanism may be employed, for example, to maintain a predetermined spatial relationship between the crests of a standing wave and the individual addressing elements of a discrete addressing mechanism.

BRIEF DESCRIPTION OF THE DRAWINGS

Further objects and advantages of this invention will become apparent when the following detailed description is read in conjunction with the attached drawings, in which.

DETAILED DESCRIPTION OF THE ILLUSTRATED EMBODIMENTS

Figure 1A:
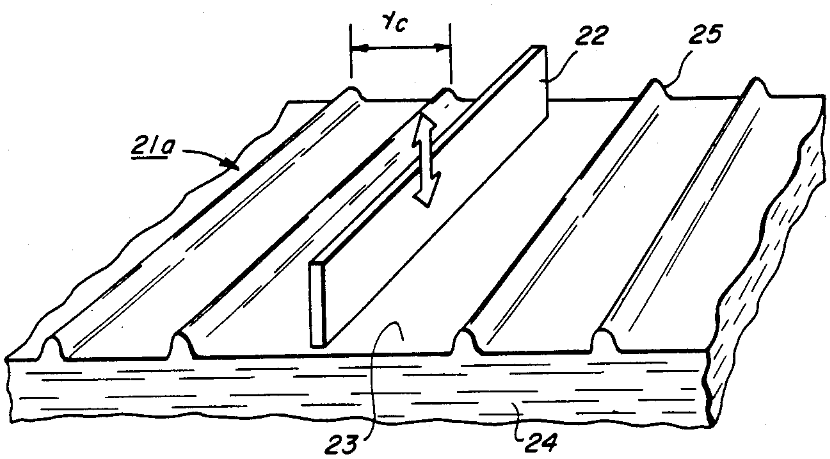
FIGS. 1A and 1B are simplified and fragmentary isometric views of mechanical capillary wave generators for generating traveling capillary waves having generally linear wavefronts.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims. To simplify the disclosure, like elements are identified in the drawings by like reference numerals.

Figure 1B:
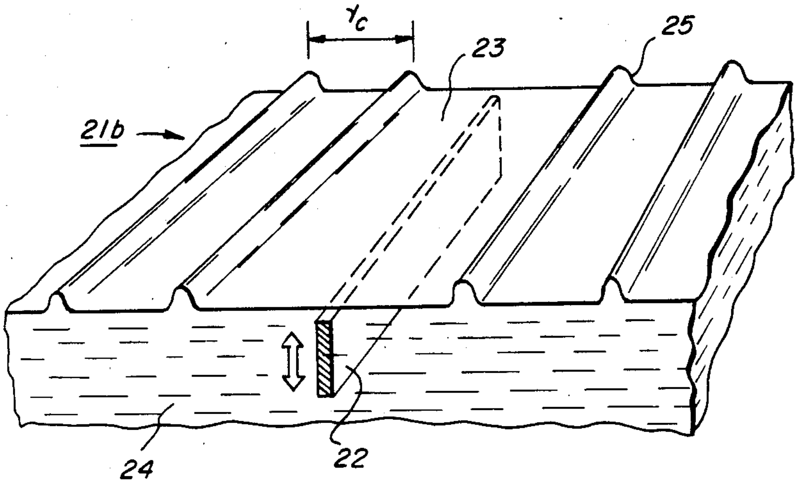

Turning now to the drawings, and at this point especially to FIGS. 1A and 1B, there are mechanical wave generators 21a and 21b, respectively, each of which comprises a thin plate 22 which is reciprocatingly driven (by means not shown) up and down, at a predetermined excitation frequency $\omega_e$, along an axis which is essentially normal to the free surface 23 of a volume or pool of liquid 24. The plate 22 periodically perturbs the pressure acting on the free surface 23 of the liquid 24 from above (FIG. 1A) or from below (FIG. 1B), thereby generating a substantially linear wavefront traveling capillary surface wave 25. The wave 25 propagates away from the plate 22 at a rate determined by the surface wave velocity, $V_s$, in the liquid 24, and its wavelength, $\lambda_c$, is given by $\lambda_c = 2\pi V_s/\omega_e$. The amplitude of the wave 25 is gradually attenuated as it propagates away from the plate 22, so the liquid 24 suitably is confined within a reservoir (not shown) which is sufficiently large that reflected waves can be ignored. FIGS. 1A and 1B depict the wave generators 21a and 21b, respectively, just prior to the time that another crest of the capillary wave 25 is raised.

Figure 2:
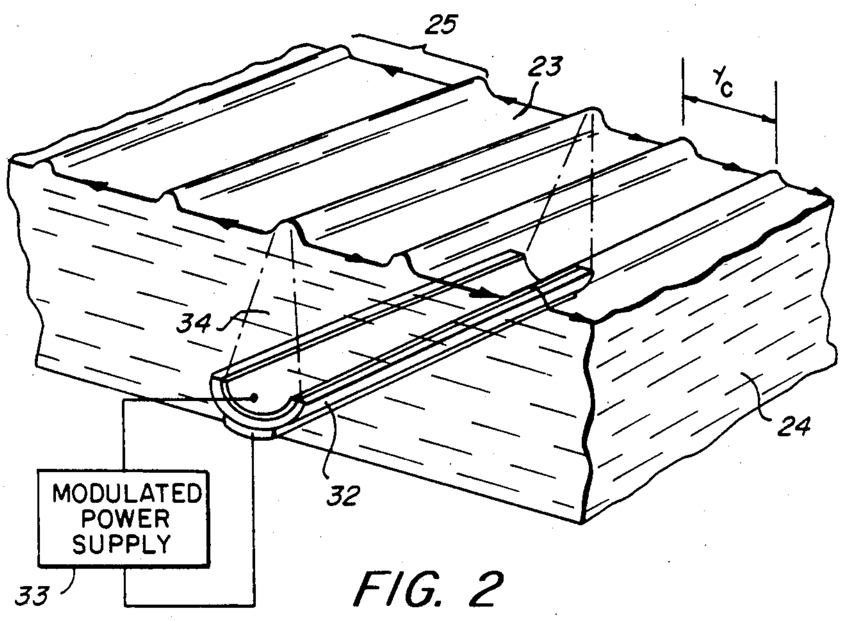
FIG. 2 is a simplified and fragmentary isometric view of an ultrasonic equivalent to the capillary wave generators shown in FIGS. 1A and 1B.

As will be appreciated, there are acoustic, thermal, electrical, pnuematic and other alternatives to the above-described mechanical wave generators. For example, as shown in FIG. 2, there is an elongated, cylindrical, shell-like piezoelectric transducer 32 which is submerged in the pool 24. The transducer 32 is connected across a rf or a near rf signal source 33 which is amplitude modulated (by means not shown) at the desired excitation frequency $\omega_e$, so it generates a sinusoidal ultrasonic pressure wave 34. As will be seen, the contour of the transducer 32 is selected to bring the pressure wave 34 to a cylindrical, line-like focus at or near the free surface 23 of the pool 24, thereby causing it to illuminate a relatively narrow strip of liquid on the surface 23. The radiation pressure exerted against this strip of liquid is periodically varied as a result of the amplitude modulation of the pressure wave 34, but the pressure remains below the critical "onset" amplitude for the parametric generation of a standing wave. Accordingly, the cylindrically focused pressure wave 34 excites the illuminated liquid at the excitation frequency $\omega_e$ to generate a generally linear wavefront traveling capillary surface wave 25 which has essentially the same characteristics and behaves in essentially the same manner as its previously described mechanically generated equivalents. Thus, it will be more generally understood that there are a variety of linear generators for generating traveling capillary surface waves having frequencies equal to the excitation frequency and wavefront geometries determined by the source geometries.

Figure 3:
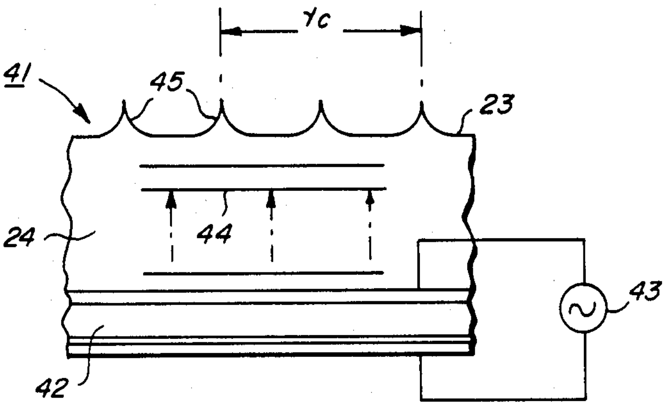
FIG. 3 PRIOR ART
FIG. 3 is a simplified and fragmentary sectional view of a more or less conventional ultrasonic generator for generating standing capillary surface waves.
Figure 4:
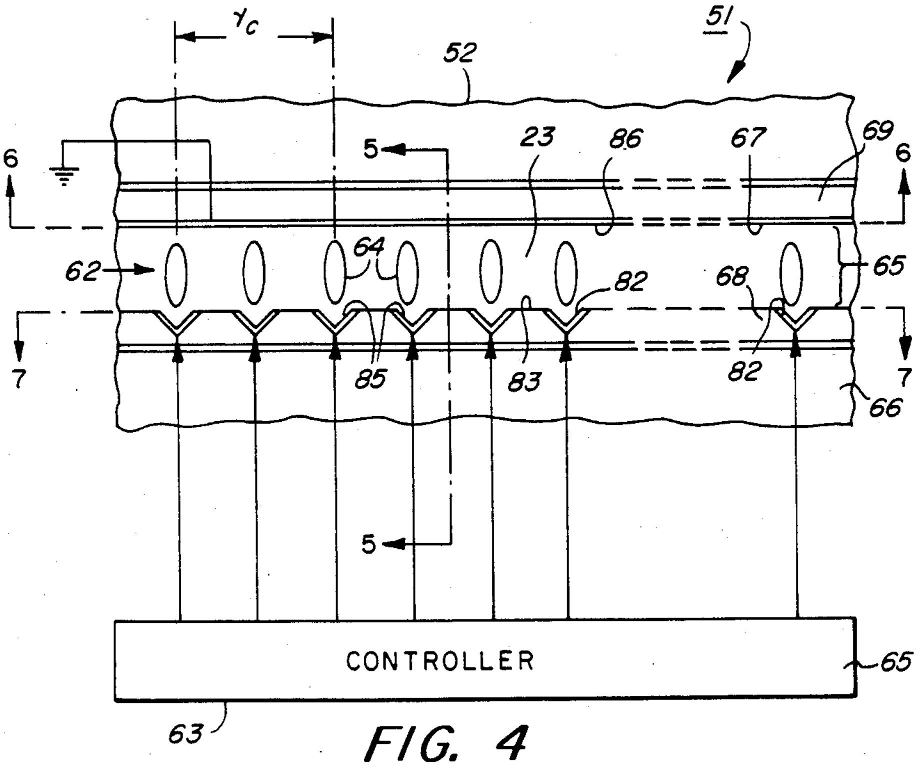
FIG. 4 is a simplified and fragmentary plan view of a capillary wave print head which is constructed in accordance with one embodiment of the present invention.

Parametric generators are a readily distinguishable class of devices because they vary the pressure exerted against the free surface 23 of the liquid 24 with an amplitude sufficient to generate one or more standing capillary surface waves thereon. The frequency, $\omega_{sc}$, of these standing waves is equal to one half the excitation frequency $\omega_e$. For example, as shown in FIG. 3, there is a generally conventional standing capillary surface wave generator 41 comprising a piezoelectric transducer 42 which is submerged in the pool 24 and connected accross a rf or near rf power supply 43, in much the same manner as the foregoing linear ultrasonic generator. In this case, however, the transducer 42 is driven at a rf or near rf excitation frequency, $\omega_e$, to radiate the free surface 23 of the pool 24 with an ultrasonic pressure wave 44 having an essentially constant ac amplitude at least equal to the critical "onset" or threshold level for the production of a standing capillary surface wave 45 on the surface 23. For printing applications and the like, the amplitude of the pressure wave 44 advantageously, is well above the critical threshold level for the onset of a standing wave, but still below the threshold level for the ejection of droplets. In other words, the capillary wave 45 preferably is excited to an "incipient" energy level, just slightly below the destabilization threshold of the liquid 24, thereby reducing the amount of additional energy that is required to free droplets from the crests of the wave 45. As will be seen, the pressure wave 44 may be an unconfined plane wave, such as shown, or it may be confined, such as in the embodiments discussed hereinbelow. An unconfined pressure wave 44 will more or less uniformly illuminate the free surface 23 of the liquid 24 over an area having a length and width comparable to that of the transducer 42.

Figure 5:
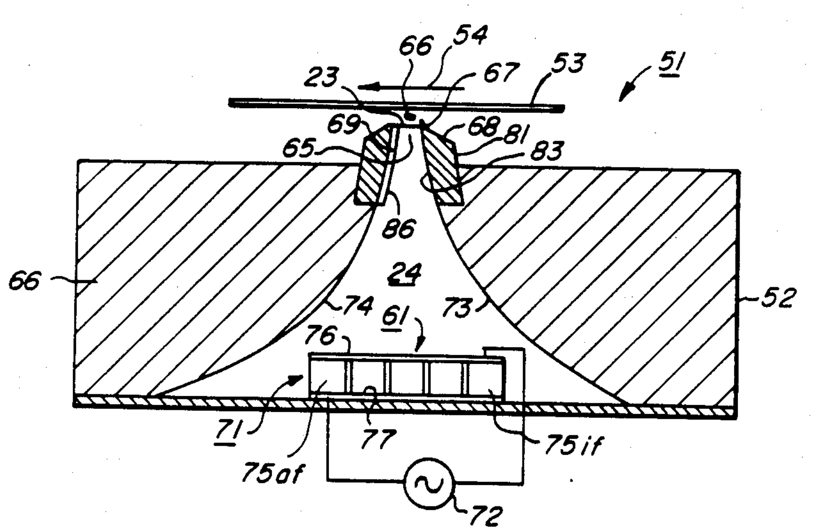
FIG. 5 is a fragmentary sectional view, taken along the line 5—5 in FIG. 4, to schematically illustrate a printer comprising the print head shown in FIG. 4.

Referring now to FIGS. 4–7, there is a line printer 51 (shown only in relevant part) having a liquid ink print head 52 for printing an image on a suitable recording medium 53, such as a sheet or web of plain paper. As in other line printers, the print head 52 extends across essentially the full width of the recording medium 53 which, in turn, is advanced during operation (by means not shown) in an orthogonal or cross-line direction relative to the print head 52, as indicated by the arrow 54 (FIG. 5). The architecture of the printer 51 imposes restrictions on the configuration and operation of its print head 52, so it is to be understood that the printer 51 is simply an example of an application in which the features of this invention may be employed to substantial advantage. It will become increasingly evident that the broader features of this invention are not limited to printing, let alone to any specific printer configuration.

In accordance with the present invention, the print head 52 comprises a wave generator 61 for generating a capillary surface wave 62 on the free surface 23 of a pool of liquid ink 24, together with an addressing mechanism 63 for individually addressing the crests 64 of the capillary wave 62 under the control of a controller 65. The wave generator 61 excites the capillary wave 62 to a subthreshold amplitude level, such as an "incipient" amplitude level as previously described, so the surface 23 supports the wave 62 without being destabilized by it. The addressing mechanism 63, in turn, selectively destabilizes one or more of the crests 64 of the wave 62 to free or eject droplets of ink (such as shown in FIG. 5 at 66) therefrom on command. To accomplish that, the addressing mechanism 63 suitably increases the amplitude of each of the selected crests 64 to a level above the destabilization threshold of the ink 24. As will be seen, the selected crests 64 may be addressed serially or in parallel, although parallel addressing is preferred for line printing. Advantageously, the addressing mechanism 63 has sufficient spatial resolution to address a single crest 64 of the capillary wave 62 substantially independently of its neighbors.

For line printing, the capillary wave 62 is confined to a narrow, tangentially elongated channel 65 which extends across substantially the full width or transverse dimension of the recording medium 53. The sagittal dimension or width of the channel 65 is sufficiently narrow (i.e., approximately one-half of the wavelength, $\lambda_c$, of the capillary wave 62) to suppress unwanted surface waves (not shown), so the wave 62 is the only surface wave of significant amplitude within the channel 65. For example, as shown, the free surface 23 of the ink 24 may be mechanically confined by an acoustic horn 66 having a narrow, elongated mouth 67 for defining the channel 65. To assist in confining the capillary wave 62 to the channel 65, the upper front and rear exterior shoulders 68 and 69, respectively, of the horn 66 desirably come to sharp edges at its mouth 67 and are coated or otherwise treated with a hydrophobic or an oleophobic to reduce the ability of the ink 24 to wet them. Alternatively, a solid acoustic horn (not shown), could be employed to acoustically confine the capillary wave 62 to the channel 65. See the aforementioned Lovelady at al. U.S. Pat. No. 4,308,547.

For generating the capillary wave 62, the wave generator 61 comprises an elongated piezoelectric transducer 71 which is acoustically coupled to the pool of ink 24, such as by being submerged therein approximately at the base of the horn 66. A rf or near rf power supply 72 drive the transducer 71 to cause it to produce a relatively uniform acoustic field across essentially its full width. Typically, the transducer 71 is substantially wider than the mouth 67 of the horn 66. Thus, the horn 66 is composed of a material having a substantially higher acoustic impedance than the ink 23 and is configured so that its forward and rearward inner sidewalls 73 and 74, respectively, are smoothly tapered inwardly toward each other for concentrating the acoustic energy supplied by the transducer 71 as it approaches the free surface 23 of the ink 24.

Figure 6:
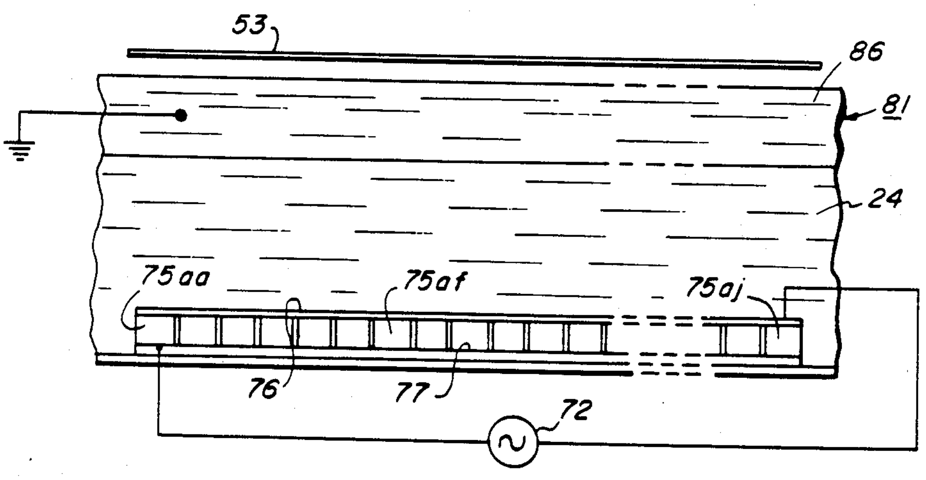
FIG. 6 is another fragmentary sectional view, taken along the line 6—6 in FIG. 4, to further illustrate the print head.
Figure 7:
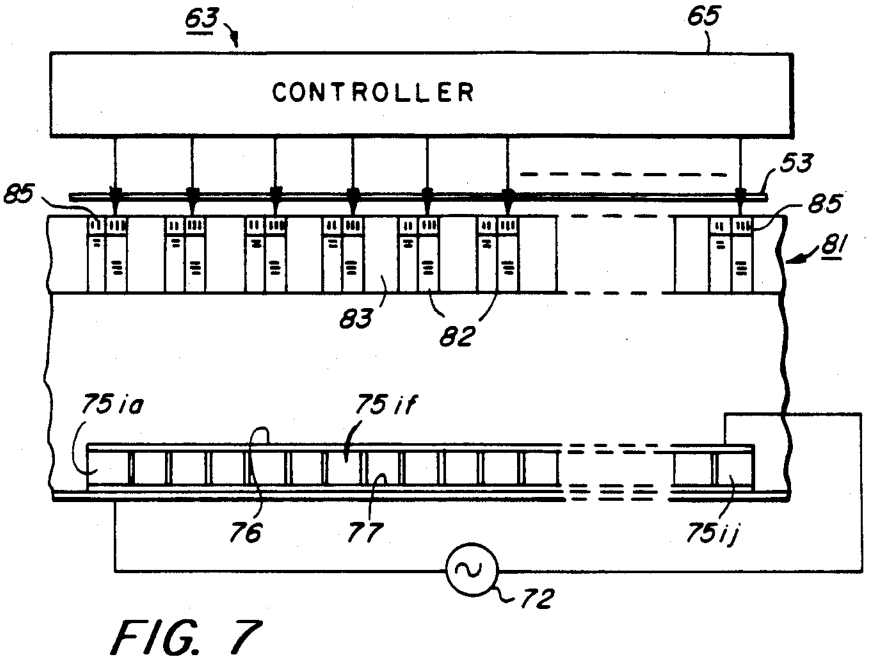
FIG. 7 is still another fragmentary sectional view, taken along the line 7—7 in FIG. 4.

In keeping with one of the more detailed features of this invention, the transducer 71 operates without any substantial internal flexure, despite its relatively large radiating area, thereby enhancing the spatial uniformity of the acoustic field it generates. To that end, as shown in FIGS. 5–7, the transducer 71 suitably comprises a two dimensional planar array of densely packed, mechanically independent, vertically poled, piezoelectric elements **75*aa*–75*ij*, such as PZT ceramic elements, which are sandwiched between and bonded to a pair of opposed, thin electrodes 76 and 77. The power supply 72 is coupled across the electrodes 76 and 77 to excite the piezoelectric elements 75*aa*–75*ij* in unison, but the surface area of the individual elements 75*aa*–75*ij*** is so small that there is no appreciable internal flexure of any of them.

Although printing could be performed by employing an appropriately synchronized addressing mechanism for addressing selected crests of a traveling capillary surface wave as they pass predetermined locations, it is easier to address crests of a standing wave, especially if the wave is structurally locked in a predetermined spatial position as described hereinbelow. Thus, in the illustrated embodiment, the peak-to-peak output voltage swing of the power supply 72 preferably is selected so that the capillary wave 62 is a standing wave of incipient energy level. Furthermore, the output frequency of the power supply 72 is selected to cause the wavelength, $\lambda_c$, of the standing wave 62 (or of a subharmonic thereof) to be approximately twice the desired center-to-center displacement or pitch, p, of adjacent pixels in the printed image (i.e., $p=\lambda_c/2N$, where N is a positive integer).

In accordance with the aforementioned copending and commonly assigned U.S. patent application of Elrod et al., provision is made for reliably and repeatedly stabilizing the longitudinal wave structure (i.e., the crests and troughs) of the standing wave 62 in a fixed spatial position lengthwise of the print head 52, so that there is no significant motion of its crests 64 laterally with respect to the recording medium 53 as a function of time. To accomplish that, the wave propagation characteristics of the free surface 24 of the ink 23 are periodically varied in a spatially stable manner along the length of the print head 52 at a spatial frequency equal to the spatial frequency of the capillary wave 62 or a subharmonic thereof. For example, a collar-like insert 81 (FIG. 5) suitably is employed to form the mouth 67 of the horn 66, and a periodic pattern of generally vertical, notches 82 are etched or otherwise cut into the forward inner sidewall 83 of the collar 81 on centers selected to cause the crests 64 of the capillary wave 62 to preferentially align with the notches 82. Advantageously, the notches 82 are formed photolithographically. See, Bean, K. E., "Anisotropic Etching of Silicon," *IEEE Transactions on Electron Devices*, Vol ED-25, No. 10, Oct. 1978, pp. 1185–1193.

To carry out the present invention, the addressing mechanism 63 may be a discrete device or a scanner for freeing droplets 66 (FIG. 5) from one or more selected crests 64 of the capillary wave 62, either by reducing the surface tension of the liquid within the selected crests 64, such as by selectively heating it or spraying it with ions, or by increasing their amplitude sufficiently to destabilize them. For example, as shown in FIGS. 4–7, the addressing mechanism 63 comprises a discrete array of addressing electrodes 85, which are seated in the wave stabilizing notches 82 to align with the crests 64 of the wave 62, together with an elongated counter electrode 86, which is supported on the opposite inner sidewall of the collar 81. One of the advantages of providing the collar 81 for the horn 66 is that entirely conventional processes may be employed to overcoat the addressing electrodes 85 and the counter electrode 86 on its forward and rearward sidewalls. As will be seen, the addressing electrodes 85 and their counter electrode 86 are relatively shallowly immersed in the ink 24.

As previously mentioned, discrete addressing mechanisms, such as the addressing mechanism 63, permit parallel addressing of the selected crests 64 of the standing wave 62. To take advantage of this feature, the addressing electrodes 85 are coupled in parallel to electrically independent outputs of the controller 65, while the counter electrode 86 is returned to a suitable reference potential, such as ground. In operation, the controller 65 selectively applies brief bursts of moderately high voltage, high frequency pulses (e.g., bursts of 50–100 μsec. wide pulses having a voltage of 300 volts or so and a frequency which is coherent with the frequency, $\omega_{sc}$, of the capillary wave 62) to those of the electrodes 85 that are assigned to the addressing of the wave crests 64 which happen to be selected at that particular time. Consequently, in keeping with the teachings of a copending and commonly assigned United States patent application of S. A. Elrod, which was filed Jan. 21, 1986 under Ser. No. 820,045 on "Capillary Wave Controllers for Nozzleless Droplet Ejectors", the addressing electrodes 85 for the selected wave crests 64 launch freely propagating "secondary" capillary waves on the free surface 23 of the ink 24. The frequency of these so-called secondary waves causes them to coherently interfere with the standing wave 62, but the interference is localized because of the propagation attenuation which the secondary waves experience. Therefore, the secondary waves constructively interfere on more or less a one-for-one basis with the nearest neighboring or selected crests 64 of the wave 62, thereby destabilizing those crests to eject individual droplets 66 (FIG. 5) of ink from them. This addressing process may, of course, be repeated after a short time delay during which an equilibrium state is reestablished.

Figure 8:
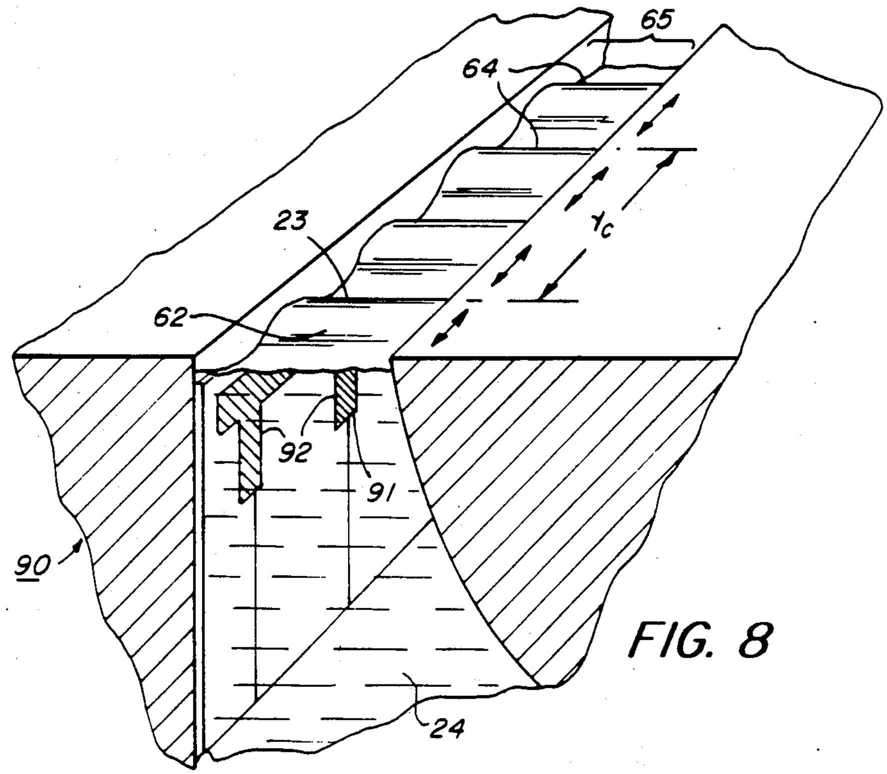
FIG. 8 is a simplified and fragmentary isometric view of an alternative embodiment of this invention.
Figure 9:
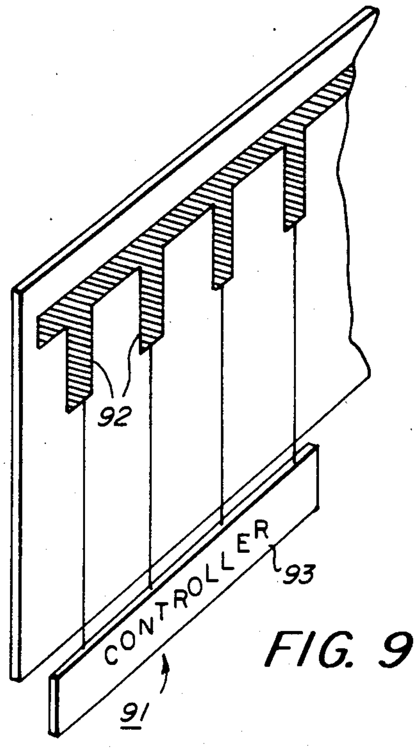
FIG. 9 is an enlarged, fragmentary isometric view of the thermal addressing mechanism for the print head shown in FIG. 8.

A print head 90 having an active mechanism 91 for spatially stabilizing the wave structure of the standing capillary wave 62 and/or for selectively addressing its individual crests 64 is shown in FIGS. 8 and 9. In this embodiment, both of those functions are performed by an array of discrete, high speed, resistive heating elements 92 which are shallowly immersed in the ink 24 and aligned longitudinally of the capillary wave 62 on generally equidistant centers. For example, the heating elements 92 may be fast rise time/fast fall time resistive heaters, such as are used in so-called "bubble jet" devices, and may be supported on an inner sidewall of the print head 90. The center-to-center displacement of the heating elements 92 is selected to be equal to one half the wavelength of the capillary wave 62 (i.e., $\lambda_c/2$) or an integer multiple thereof, so that the controller 93 may (1) spatially modulate the heating elements 92 at the spatial frequency of the capillary wave 62 or at a subharmonic thereof, and/or (2) selectively modulate the heating elements 92 as a function of time to cause them to individually address selected crests 64 of the capillary wave 62. Freely propagating capillary waves (i.e., referred to hereinabove as "secondary" waves) are launched from the modulated heating elements 92 on account of the localized expansion and contraction of the ink 24. Accordingly it will be understood that the aforementioned spatial modulation of the heating elements 92 periodically varies the wave propagation characteristics of the free surface 23 of the ink 24 at a suitable spatial frequency to cause the crests 64 of the capillary wave 62 to preferentially align in a fixed spatial location relative to the heating elements 92. The time modulation of the heating elements 92, on the other hand, produces additional secondary capillary waves which constructively interfere with the selected crests 64 of the capillary wave 62 to free individual droplets of ink therefrom, as previously described.

Figure 10:
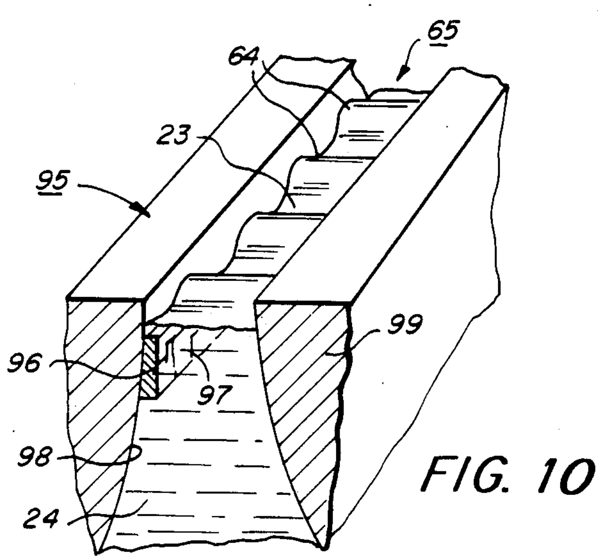
FIG. 10 is a simplified and fragmentary isometric view of a print head constructed in accordance with still another embodiment of the present invention.
Figure 11:
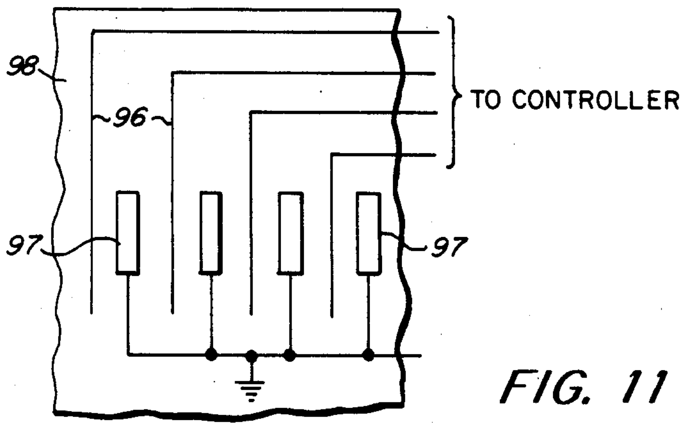
FIG. 11 is an enlarged, fragmentary elevational view of the interdigitated electrodes used in the addressing mechanism for the print head shown in FIG. 10.

Various alternatives will be evident for spatially addressing selected crests 64 of the capillary wave 62 and/or for spatially stabilizing its wave structure. For example, as shown in FIGS. 10 and 11, there is a print head 95 having a plurality of interdigitated discrete addressing electrodes 96 and ground plane electrodes 97 which are deposited on or otherwise bonded to an inner sidewall 97 of an acoustic horn 98. The print head 97 utilizes the operating principles of the addressing mechanism 63 shown in FIGS. 4–7 to address selected crests 64 of the wave 62, but its individual addressing electrodes 96 also are spatially modulated to spatially stabilize the structure of the capillary wave 62 with respect to the addressing electrodes 96 as previously described with reference to FIGS. 8 and 9.

Figure 12:
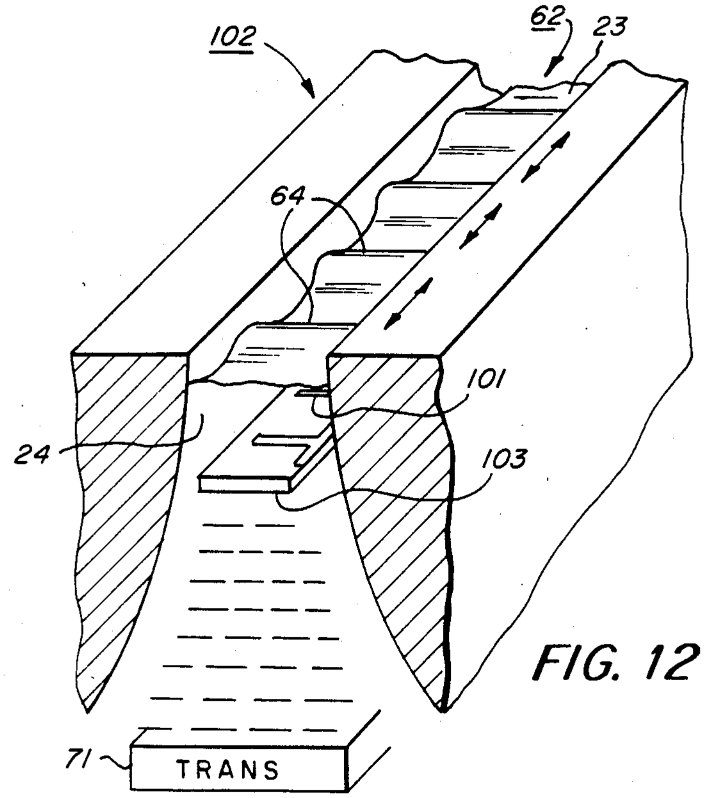
FIG. 12 is a simplified and fragmentary isometric view of a print head having a transversely mounted discrete addressing mechanism.

Another possible alternative is shown in FIG. 12 where discrete electrical or thermal addressing elements 101 for a print head 102 are supported on a suitable substrate, such as a Mylar film 103, in a transverse orientation just slightly below the free surface 23 of the ink 24.

Figure 13:
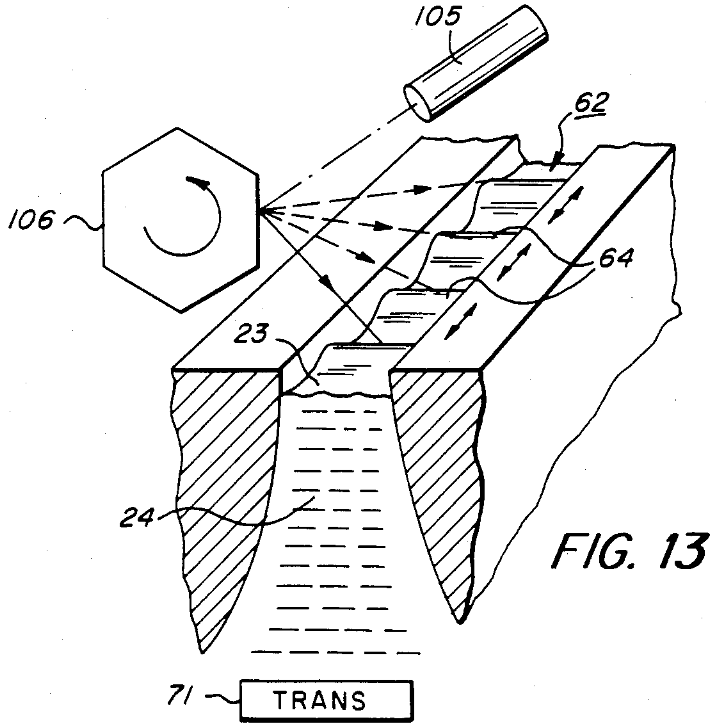
FIG. 13 is a simplified and fragmentary isometric view of a print head having a scanning addressing mechanism

Still another alternative is shown in FIG. 13 where there is a laser 105 for supplying a suitably high power modulated light beam, together with a rotating polygon 106 for cyclically scanning the modulated laser beam lengthwise of the capillary wave 62, whereby the laser beam serially addresses selected crests 64 of the wave 62 by heating them.

CONCLUSION

In view of the foregoing, it will now be understood that the present invention provides methods and means for spatially addressing capillary surface waves. The invention has important applications to liquid ink printing, but it will be evident that it is not limited thereto.

What is claim is:

1. In combination with a volume of liquid having a free surface, and means for generating a capillary wave on said free surface; said capillary wave having a periodic wave structure including crests and troughs; the improvement comprising means for individually and selectively addressing selected crests of said capillary wave to locally alter a surface property of the liquid within said selected crests.

2. The combination of claim 1 wherein the surface of the liquid within the selected crests is switched from a stable state to an unstable state, whereby droplets of liquid are freed therefrom.

3. The combination of claim 1 wherein said capillary wave is a standing wave having a predetermined spatial frequency along at least one axis.

4. The combination of claim 3 further including means for periodically varying a wave propagation characteristic of said free surface, at least along said one axis, at a spatial frequency selected to cause the crests of said standing wave to preferentially align at predetermined spatial locations along said axis.

5. The combination of claim 4 wherein said addressing means comprises a plurality of discrete addressing elements which are aligned with respective ones of said spatial locations to selectively address individual ones of said crests in parallel on command.

6. The combination of claim 5 wherein the surface of the liquid within the selected crests is switched from a stable state to an unstable state, whereby droplets of liquid are freed from the selected crests.

7. The combination of claim 6 further including a recording medium disposed adjacent the free surface of said liquid for receiving the droplets freed from the selected crests.

8. The combination of claim 7 further including means for confining said standing wave to said one axis, and wherein said recording medium is advanced in an orthogonal direction relative to said axis, whereby said droplets form an image on said recording medium line-by-line.

9. The combination of claim 1 wherein said wave generating means comprises an acoustic transducer means for radiating the free surface of said liquid with an ultrasonic pressure wave, said transducer means including a plurality of mechanically independent piezoelectric elements which are poled in a direction normal to said free surface, and means for exciting said piezoelectric elements in unison, thereby causing said pressure wave to have a relatively uniform amplitude.

10. The combination of claim 9 wherein the amplitude of said pressure wave is selected to at least equal an onset amplitude for the production of a standing capillary wave on the free surface of said liquid.

11. The combination of claim 10 further including means for confining the periodic wave structure of said standing wave to a predetermined axis.

12. The combination of claim 11 wherein said confining means comprises an acoustic horn which is elongated along said predetermined axis;

said horn having, in a plane orthogonal to said axis and normal to said free surface, a relatively narrow mouth for confining said wave structure to said axis, a broader base, and a smoothly tapered interior profile;

said liquid being disposed within and substantially filling said horn; and said transducer means being submerged in said liquid near the base of said horn.

* * * * *